United States Patent [19]

Dinc et al.

[11] Patent Number: 5,867,766
[45] Date of Patent: Feb. 2, 1999

[54] TECHNIQUE FOR PERFORMING AN AUTOMATIC CHANNEL SEARCH AND SWITCH DURING TALK-TIME IN MOBILE TRANSCEIVERS

[75] Inventors: Abdulkadir Dinc, Franklin Township, Somerset County; Theodore G. Lubbe, Branchburg, both of N.J.

[73] Assignee: Lucent Technologies Inc., Murray Hill, N.J.

[21] Appl. No.: 843,087

[22] Filed: Apr. 25, 1997

[51] Int. Cl.[6] .................................................. H04B 15/00
[52] U.S. Cl. ......................... 455/62; 455/67.1; 455/67.3; 455/73; 455/226.2; 455/561; 455/214
[58] Field of Search ............................... 455/62–63, 67.1, 455/67.3, 73, 88, 462, 464, 550, 561, 575, 226.1, 226.2, 296, 283, 307, 312, 337, 179.1, 184.1, 161.3, 221, 214, 450, 455, 501, 517; 375/225, 224, 227, 267, 285, 325, 346–348, 344, 317–319

[56] References Cited

U.S. PATENT DOCUMENTS 5,222,255  6/1993  Kuo et al. ............................... 455/296
5,410,750  4/1995  Cantwell et al. ....................... 455/307
5,603,082  2/1997  Hamabe ................................... 455/62

*Primary Examiner*—Doris H. To

[57] ABSTRACT

A transceiver system having a base unit and a handset for communicating over a number of communication channels that are automatically switched during talk-time. A received-signal-strength-indicator (RSSI) circuit connects to the receiver for measuring the average energy received by the receiver over a baseband frequency bandwidth. The average energy includes the information, interference and noise portions of the received energy. The RSSI circuit transmits an RSSI output when the average energy exceeds a predetermined RSSI threshold. A discriminator-interference-and-noise-energy (DINE) circuit connects to the receiver for measuring out-of-band energy received by the receiver which is above the baseband frequency bandwidth. The out-of-band energy primarily comprises interference and noise energy. The DINE threshold detector provides a DINE output when the out-of-band energy exceeds a predetermined DINE threshold. A microcontroller connects to the RSSI and DINE circuits for monitoring, in real time, the RSSI and DINE outputs to detect the appearance of an interferer on the currently used communication channel. When an interferer is detected, the carrier frequency is automatically switched to a clean communication channel.

20 Claims, 3 Drawing Sheets

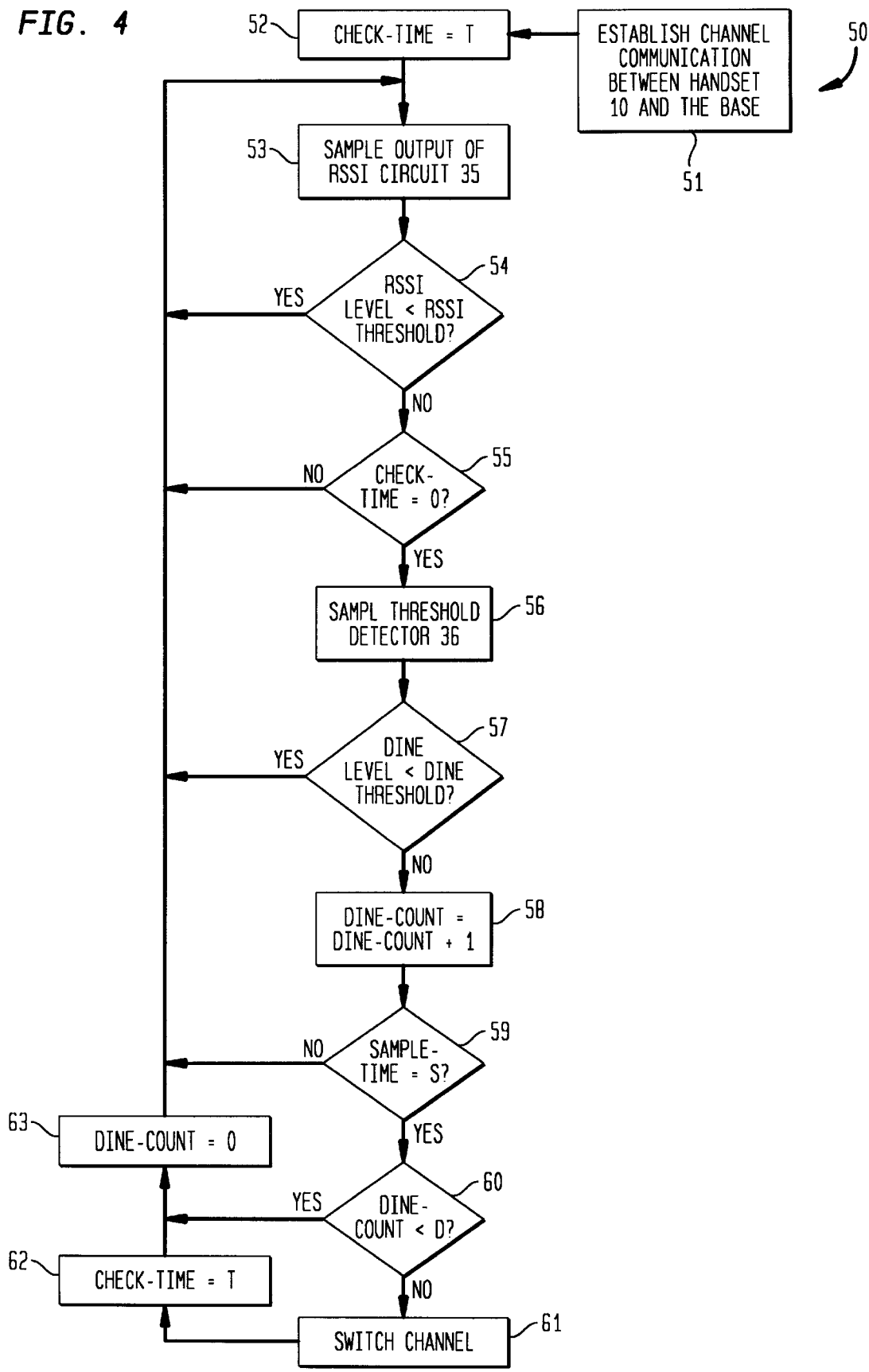

TECHNIQUE FOR PERFORMING AN AUTOMATIC CHANNEL SEARCH AND SWITCH DURING TALK-TIME IN MOBILE TRANSCEIVERS

FIELD OF THE INVENTION

This invention relates in general to mobile transceiver systems and methods, and more particularly to a technique for performing an automatic channel search and switch during talk-time with a mobile transceiver.

BACKGROUND OF THE INVENTION

It is well known that the performance of cordless and cellular telephones, and other mobile transceivers is susceptible to hostile environments, such as multipath fading and interference from similar units, and noise from other sources. In order to establish a good communication link between the units of a transceiver, e.g., between a handset and its base unit, over a particular channel, it is important to know in advance whether that channel is "clean" or not, i.e., whether or not the channel is in use or subject to unacceptable levels of noise and/or interference. If a channel is found to be clean, then the frequency corresponding to that channel is used as the carrier of the information signals, which may be speech and/or data. If the channel is known to be in use or of insufficient quality, then the equipment looks for another channel to establish the communication link.

Many conventional cordless telephones with frequency-modulation (FM) schemes provide 25 or more different FM carriers. These cordless telephones typically include a circuit located in the handset that automatically seeks a clean channel and establishes an information link between the handset and base using the corresponding FM carrier. Upon establishing the information link, the base unit goes off-hook and talk-time begins. However, if during talk-time the selected channel should become subject to unacceptable levels of noise or interference, it is usually left to the user to manually seek a clean channel via a channel-switch button, which is normally located on the handset.

The procedure used by many conventional handsets to establish a communication link involves the steps of first measuring the strength of a received signal, including information, noise and interference, over one of the available channels, and then comparing that measurement to a predetermined threshold. If the threshold is exceeded, then that channel is ignored, since it is assumed that that channel is either busy (someone else is using that channel) or unacceptably noisy. The handset then moves to a different channel and the measurement and comparison steps are repeated. When a channel is found to have a measured signal strength that does not exceeded the predetermined threshold, the handset informs the base of the selected carrier frequency and, if the base approves, establishes an information link with the base which then goes off-hook. If the base does not approve of the chosen carrier frequency, the process is repeated.

Conventional cordless telephones usually include received-signal-strength-indicator (RSSI) circuits in both the handset and base. RSSI circuits typically conduct average energy measurements of an FM carrier, which includes the information portion (e.g., the speech and/or data), plus the interference and noise portions. The RSSI circuits also compare that average energy measurement, referred to as the RSSI level, to a predetermined RSSI threshold to determine whether or not the RSSI level exceeds the RSSI threshold. Many of the currently available cordless telephones routinely use an RSSI output in a channel searching procedure to check if a channel is free and clear before establishing an information link between the handset and the base. If the RSSI level is higher than the predetermined RSSI threshold, indicating that that channel is in use or otherwise not clean, then that channel is rejected and another channel is tested. This channel searching procedure recycles until a clean channel is found, at which time control circuitry in the handset will attempt to establish an information link with the base using the FM carrier corresponding to the clean channel. During talk-time, cordless telephones normally do not use an RSSI output, or any other indicator, to monitor the performance of the presently used channel to see if it is becoming noisy or unstable.

It is known that in a benign environment, the RSSI levels vary with the distance between the handset and the base, that is, as a user with a handset moves farther away from the base, the RSSI levels drop. Channel switching may even prove impossible, notwithstanding an RSSI output that appears to indicate that a particular channel is free and clean, i.e., the RSSI level for that channel is below the RSSI threshold.

As mentioned above, a user wishing to change channels during talk-time can usually do so by pressing a button on the handset. In response to such a user request, a control circuit will search for a new channel in accordance with the above-described procedure. Although circuits that perform a manual channel switch during talk-time have served the purpose, they have not proved effective under all conditions for a number of reasons. For example, in some cases, a manual channel switch during talk-time can prove impossible. Consider the case where a user with a handset is located far from the base (the RSSI level is relatively low) and a strong interferer appears on the user's channel. In that case, the user will not be able to manually switch to a new channel if the communication link between the user's handset and the base is so corrupted by the interferer that the base and handset cannot exchange the necessary control signals required to execute a channel switch. Moreover, a user with a corrupted communication link, as just described, may not even be able to transmit the appropriate control signals to the base that are required to hang the telephone up. Additionally, for many users, manual channel switching can be ineffective because these users either do not know how to perform a channel switch, or they find manual switching during talk-time to be cumbersome and annoying. Therefore, those concerned with the development of cordless and cellular telephones, and other mobile transceivers have recognized a need for a technique of automatically performing a channel search and switch in real time during talk-time. The present invention addresses this need.

SUMMARY OF THE INVENTION

This invention provides a mobile transceiver system for communication between transceiver units over a communication channel selected from a plurality of available communication channels. The system comprises a first transceiver unit having a transmitter and a receiver for communicating over one of the available communication channels and a second transceiver unit for communicating with first transceiver unit over one of the communication channels. A microcontroller connects to the receiver for monitoring the level of received radio-frequency (rf) energy within a baseband frequency bandwidth and the level of received out-of-band audio energy within a bandwidth located above the baseband frequency band to detect in real time the appearance of an interferer on the communication channel. A carrier apparatus, responsive to the microcontroller detecting the appearance of an interferer, selectively switches channels by changing the carrier frequency.

Another aspect of the invention comprises a transceiver unit for communicating over a communication channel selected from a plurality of available communication channels. The transceiver unit comprises a transmitter for transmitting energy having a carrier frequency corresponding to one of the communication channels and a receiver for receiving energy having a carrier frequency corresponding to one of the communication channels. A received-signal-strength-indicator (RSSI) connects to the receiver for measuring the average energy, including information, interference and noise, received by the receiver over an intermediate frequency bandwidth. A discriminator-interference-and-noise-energy (DINE) apparatus connects to the receiver for demodulating the rf carrier and measuring out-of-band energy received by the receiver. The out-of-band energy primarily comprises interference and noise energy located above the baseband frequency band. A microcontroller connects to the RSSI apparatus and the DINE apparatus for monitoring the level of the average energy above an RSSI threshold and the level of the out-of-band energy above a DINE threshold to detect in real time the appearance of an interferer on the communication channel. A carrier apparatus connects to the receiver and the transmitter, for selectively switching the carrier frequency in response to the microcontroller detecting the appearance of an interferer.

Still another aspect of the present invention includes a method of operating a transceiver unit for communicating over a communication channel selected from a plurality of available communication channels. The method comprises the steps of: transmitting energy having a carrier frequency corresponding to one of the communication channels; receiving energy having a carrier frequency corresponding to one of the communication channels; measuring the average energy received by the transceiver unit over a baseband frequency bandwidth, the average energy including information, interference and noise portions of the average energy; measuring out-of-band energy received by the transceiver unit, the out-of-band energy primarily comprising interference and noise energy located above the baseband frequency band; monitoring the level of the average energy above a first threshold and the level of the out-of-band energy above a second threshold in real time to detect the appearance of an interferer on the communication channel; and selectively switching the carrier frequency to cause the transceiver unit to communicate over a different communication channel when the monitoring step detects the appearance of an interferer.

BRIEF DESCRIPTION OF THE DRAWINGS

A more complete understanding of the present invention may be obtained from consideration of the following description in conjunction with the drawings in which:

FIG. 4 is a high-level computer flow chart illustrating the operation of the mobile transceiver system of FIG. 3.

DETAILED DESCRIPTION OF AN ILLUSTRATIVE EMBODIMENT

Figure 1:
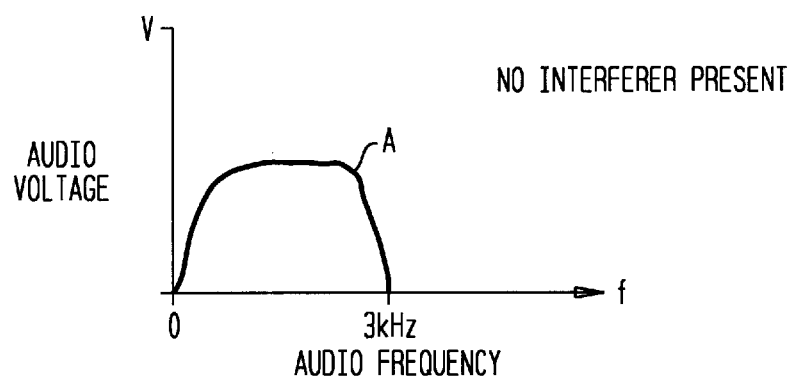
FIG. 1 shows a graph of volts (V) vs. frequency (f), illustrating a baseband frequency spectrum for received energy of a mobile receiver in the absence of interfering energy.
Figure 2:
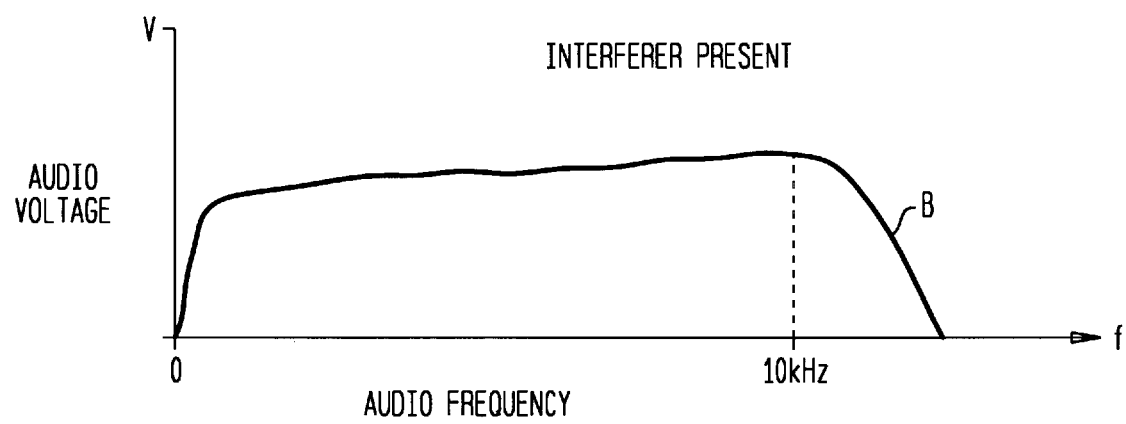
FIG. 2 shows a graph of volts (V) vs. frequency (f), similar to the graph of FIG. 1, illustrating a baseband frequency spectrum for received energy of a mobile receiver in the presence of interfering energy.

Referring now to the drawings, the curves depicted in FIGS. 1 and 2, which plot voltage (V) vs. audio frequency (f), illustrate the spectrums for received audio energy for the units of a mobile transceiver. Curve A of FIG. 1 depicts a typical audio spectrum in which a transceiver's base and handset are communicating over a relatively clean channel with no interferer present. Standard FM cordless telephones typically employ a baseband bandwidth of about 3 kHz. Consequently, under normal conditions, substantially all of the audio energy will fall in the 0–3 kHz range as depicted in FIG. 1.

When an interferer is present, however, the interferer's signal and the desired signal mix. As illustrated by curve B in FIG. 2., this unwanted mixing of the interferer's signal and the desired signal causes additional audio to appear at the higher frequencies with significant energy located above 3 kHz and often peaking near 7–10 kHz. In a manner to be described below in detail, the present invention employs the characteristics of curves A and B to automatically detect in real time the presence of an interferer and to automatically change the channel when a interferer appears.

Figure 3:
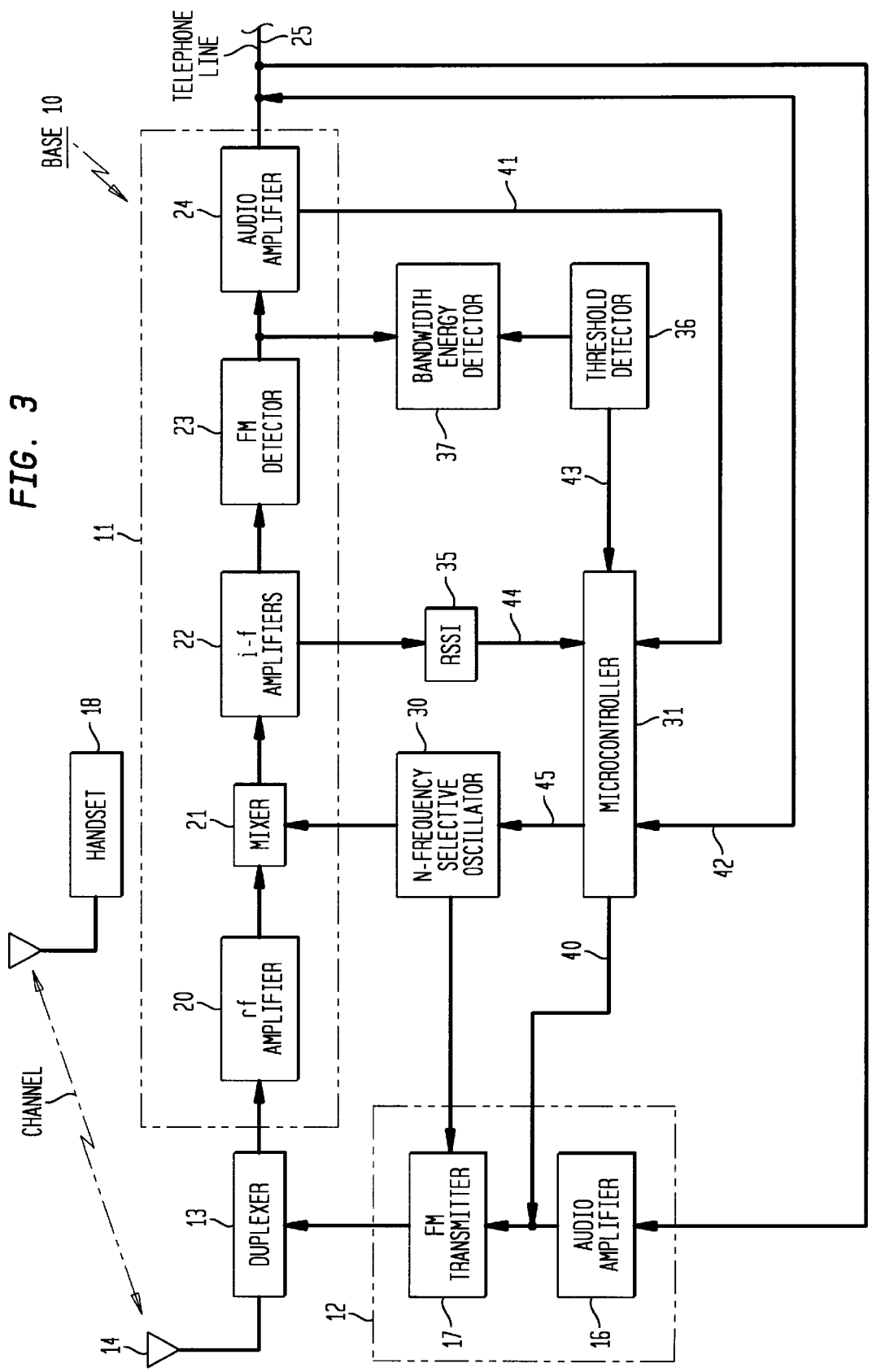
FIG. 3 is a simplified block diagram of a mobile transceiver system having a base and a handset in accordance with the present invention.

The inventive technique may be implemented on the base and or the handset of a mobile transceiver. FIG. 3 illustrates an implementation of the invention on base 10 of a cordless telephone system having a conventional handset 18. Base 10 comprises receiver section 11 and transmitter section 12, each connected to duplexer 13 for communicating in full duplex mode via antenna 14 to handset 18. Transmitter section 12, which connects to telephone line 25, comprises conventional circuitry comprising audio amplifier 16 and FM transmitter 17. Receiver section 11 includes rf amplifier 20, mixer 21, i-f amplifiers 22, FM detector 23 and audio amplifier 24, each connected in a conventional manner.

Transmitter 17 transmits an audio signal that is frequency modulated onto a carrier signal having one of N possible frequencies selectively transmitted by N-frequency selective oscillator 30. As mentioned above, conventional cordless telephones normally use 25 different carrier frequencies. FM signals received by receiver section 11 are mixed in mixer 21 with an output of oscillator 30 to produce an i-f signal that i-f amplifiers 22 amplify and transmit to FM detector 23. The demodulated audio at an output of FM detector 23 is amplified by audio amplifier 24 before being fed to telephone line 25.

Microcontroller 31 connects to FM transmitter 17, audio amplifier 24, telephone line 25, RSSI circuit 35, threshold detector 36 and oscillator 30. Microcontroller 31 transmits control signals to handset 18 via line 40 and FM transmitter 17, and receives control signals from handset 18 via audio amplifier 24 and line 41. Control signals also flow between telephone line 25 and microcontroller 31 over line 42. Further, threshold detector 36 and RSSI circuit 35 transmit outputs to microcontroller 31 over lines 43 and 44, respectively. Finally, microcontroller 31 tunes oscillator 30 to one of the N possible carrier frequencies via line 45.

RSSI circuit 35, a conventional circuit that connects to i-f amplifiers 22, measures the strength of the received radio-frequency (rf) signal over an i-f frequency bandwidth. In the case of a conventional cordless telephone, that i-f bandwidth may be in the order of 15 kHz. Consequently, RSSI circuit 35 performs an average energy measurement of the rf signal received by receiver section 11. That average rf energy measurement, referred to as the RSSI level, will normally include the information portion (e.g., the speech and/or data) plus the interference and noise portions of the rf signal appearing at the i-f amplifiers 22. RSSI circuit 35 further includes a threshold detector that feeds an RSSI output to microcontroller 31 to indicate whether or not the RSSI level exceeds the predetermined RSSI threshold.

The output of FM detector 23 connects to bandwidth energy detector 37, which measures an average of the energy contained in a high-frequency, out-of-band portion of the detected audio. This measured out-of-band energy is referred to herein as the discriminator-interference-and-noise-energy (DINE) level. Using the illustrative example of FIGS. 1 and 2, bandwidth energy detector 37 would preferably measure a DINE level for energy contained within a DINE bandwidth extending from about 3 kHz to 10 kHz. This particular DINE bandwidth is preferred because it excludes audio in the normal baseband, i.e., 0–3 kHz, and includes a significant portion of the out-of-band energy that a typical interferer or noise source would generate when mixed with the desired signal.

The DINE output, i.e., the output of threshold detector 36, tells microcontroller 31 whether or not the DINE level exceeds the predetermined DINE threshold. The DINE threshold is set to a level such that the presence of energy above the DINE threshold for a significant time period would be sufficient to degrade the quality of the communication channel to an unacceptable limit.

The operation of base 10 will now be described with respect to FIGS. 1–4. As described above, when a user energizes handset 18 to initiate a standard cordless telephone call, handset 18 automatically finds a clean channel in conjunction with the base and establishes an information link with the base in a conventional manner. At that point, microcontroller 31 will transmit signals to handset 18 via FM transmitter 17, duplexer 13 and antenna 14. Also, microcontroller 31 will receive signals from handset 18 via audio amplifier 24.

During talk-time, microcontroller 31 monitors in real time the quality of the communication channel via the outputs of RSSI 35 and threshold detector 36. FIG. 4 is a high-level flow chart illustrating a heuristic algorithm 50 that microcontroller 31 executes in real time when monitoring the quality of an established information link between base 10 and handset 18.

The real time monitoring of the current communication channel begins after a communication link has been established between base 10 and handset 18 via step 51 in FIG. 4. To begin, microcontroller 31 sets a CHECK-TIME timer to a value T in step 52. The CHECK-TIME timer is a counter within microcontroller 31 which counts down from the value T to zero. The value T is chosen such that the corresponding time period compares to a typical time duration that a user would need to decide that the current channel is too noisy for good communication. Thus, the value T would be determined by human engineering factors. For instance, assume a situation where the environment is noisy and there are short-duration, periodic interferences. In this instance, a user may be disturbed more by switching the channel every two seconds, which can create a muting effect, than by listening to the interference. But if the CHECK-TIME timer is set to a level T such that a channel is checked about every ten seconds or more, real time channel switching may not have as much of a disturbing effect on the user.

Microcontroller 31 next samples the output of RSSI circuit 35 via sample step 53 and then invokes decision step 54. In steps 53 and 54, algorithm 50 essentially determines if the current channel energy is of sufficient strength to maintain channel communications. It is noted that if a user with handset 18 should move away from base 10 after having established a clean communication link, the carrier energy can become so weak that the measured rf energy, i.e., the RSSI level, will not exceed the RSSI threshold. Of course, in that instance it will be unnecessary to check for an interferer. Thus, algorithm 50 returns to sample step 53 via the YES path of decision step 54. However, if the current channel energy is found to be sufficiently strong, that is, the RSSI level exceeds the RSSI threshold, algorithm 50 exits decision step 54 along the NO path and proceeds to check for the presence of an interferer on the channel.

In decision step 55, microcontroller 31 looks at the CHECK-TIME to determine if a time period at least equal to T has passed, i.e., CHECK-TIME=0, since the last time that the channel was switched. Consequently, while the CHECK-TIME counter counts down from T to 0, algorithm 50 will continue to cycle and recycle back to step 53 via the NO path from decision step 55.

When executing decision step 55 the CHECK-TIME=0, algorithm 50 will exit along the YES path to sample step 56 and then to decision step 57. Steps 56 and 57 essentially determine if an interferer may be present on the currently used channel, i.e., whether or not the DINE level exceeds the DINE threshold. If the DINE level is less than the DINE threshold, no interferer is present and there is no need to switch channels. Consequently, in that case, algorithm 50 exits the YES path of decision step 57 and returns to sample step 53.

However, if the DINE level exceeds the DINE threshold, algorithm 50 exits the NO path of decision step 57 and enters a hysteresis routine comprising steps 58, 59 and 60. In step 58, microprocessor 31 increments a DINE counter (DINE-COUNT=DINE-COUNT+1). In decision step 59, algorithm 50 checks a predefined sampling time, called the DINE-COUNT-TIME, for a time period S. In decision step 60, algorithm 50 checks the DINE counter to see if the DINE-COUNT has reached a predetermined DINE threshold D. Thus, in steps 58 and 59 the DINE counter counts the number of times that the DINE level exceeded the DINE threshold during a time period S, i.e., DINE-COUNT-TIME=S. In step 60 the DINE counter is checked for the value D. Steps 58, 59 and 60 essentially introduce into the process sufficient hysteresis, or sluggishness, to prevent unnecessary channel switching based on spurious interference. Specifically, the hysteresis routine insures that the DINE threshold is exceeded at least a reasonable number of times D in a predefined time period S before switching to a new channel. Thus, when the SAMPLE-TIME=S and the DINE-COUNT=D, algorithm 50 exits the NO path of decision step 60 and executes step 61 to switch from the current channel to a new channel. Microcontroller 31 informs handset 18 of the new corresponding carrier frequency. Then algorithm 50 resets the CHECK-TIME to the value T, step 62, resets the DINE-COUNT to zero, step 63, and returns to sample step 53 to repeat the process.

Obviously many implementations, modifications and variations of the present invention are possible in the light of the above teachings. For example, the invention may be implemented on only handset 18 or on both handset 18 and base 10. Further, if digital signal processors (DSP) are used, a more precise RSSI measurement can be done at base 10 or handset 18 before going off-hook.

Additionally, the circuitry can be modified to be in a constant search for the best channels, say, the best 10 channels among the 25 available channels. These best channels can be ordered in a look-up table which may be adaptively updated. Then, as the next telephone call begins the system can select the predetermined best channel from the look-up table. The channel switching functions during talk-time may also be performed by looking for the next best channel in the look-up table. In this regard, base 10 would transmit the next best channel information to handset 18 over the currently used to the After that information is acknowledged by handset 18, both units would switch to the second best channel in the look-up table. While the current channel may be degraded, it will usually be of sufficient quality for the channel switch information and other control signals to be received correctly, perhaps after a few trials, by the units to acknowledge each other.

The invention is especially suitable for implementation on the units of a cordless telephone having a DSP platform. At essentially no additional cost, the band-pass filtering, energy measurements, energy threshold detection with hysteresis, and channel switching algorithms can each be implemented with DSP software.

Accordingly, this description is to be construed as illustrative only, and is for the purpose of teaching those skilled in the art the best mode of carrying out the invention. Details of the technique may be varied substantially without departing from the spirit of the invention and the exclusive use of all modifications which come within the scope of the appended claims is reserved.

What is claimed is:

1. A transceiver unit for communicating over a communication channel selected from a plurality of available communication channels comprising:

a transmitter means for transmitting energy having a carrier frequency corresponding to one of said communication channels;

a receiver means for receiving energy having a carrier frequency corresponding to said one of said communication channels;

a received-signal-strength-indicator (RSSI) means connected to said receiver means for measuring the average energy received by said receiver means over a baseband frequency bandwidth, said average energy including information, interference and noise portions of said average energy;

a discriminator-interference-and-noise-energy (DINE) means connected to said receiver means for measuring out-of-band energy received by said receiver means, said out-of-band energy primarily comprising interference and noise energy located above the baseband frequency band;

a microcontroller means connected to said RSSI means and said DINE means for monitoring the level of said average energy above an RSSI threshold and the level of said out-of-band energy above a DINE threshold to detect in real time the appearance of an interferer on said one of said communication channels; and carrier means for selectively switching said carrier frequency to cause said transceiver unit to communicate over a communication channel different from said one of said communication channels, said carrier means connected to said receiver means and said transmitter means, and responsive to said microcontroller means when said microcontroller means detects the appearance of an interferer.

2. The transceiver unit of claim 1, wherein said receiver means has a radio-frequency (rf) section and said RSSI means connects to said rf section for measuring the average rf energy received by said receiver means.

3. The transceiver unit of claim 2, wherein said receiver means has an audio section and said DINE means connects to said audio section, said audio section including detector means for detecting baseband audio energy and out-of-band audio energy located above said baseband audio energy.

4. The transceiver unit of claim 3, wherein said DINE means includes a bandwidth energy detector having a passband corresponding to a section of the frequency band of said out-of-band energy, and a threshold detector connected between said bandwidth energy detector and said microcontroller means.

5. The transceiver unit of claim 4, wherein said carrier means connects to said rf section for detecting rf energy transmitted over a selected communication channel.

6. The transceiver unit of claim 5, wherein said carrier means includes a multiple-frequency selective oscillator and said microcontroller means includes means for selectively tuning said oscillator to cause said transceiver unit to communicate over a selected communication channel.

7. The transceiver unit of claim 6, wherein said microcontroller means includes a clock means for causing said microcontroller means to monitor the level of said out-of-band energy only after the expiration of a predetermined CHECK-TIME period measured from the previous time that said carrier means switched said carrier frequency.

8. The transceiver unit of claim 7, wherein said microcontroller means includes a hysteresis means for causing said microcontroller means to detect the appearance of an interferer only after said microcontroller means has found said level of said out-of-band energy to be above said DINE threshold at least a predetermined number of times over a predetermined time period.

9. A mobile transceiver system for communication between transceiver units over a communication channel selected from a plurality of available communication channels comprising:

a first transceiver unit having transmitter means and receiver means for communicating over one of said available communication channels;

a second transceiver unit having means for communicating with said first transceiver unit over said one of said communication channels;

a microcontroller means connected to said receiver means for monitoring the level of received rf energy within a baseband frequency bandwidth and the level of received out-of-band audio energy within a bandwidth located above the baseband frequency band to detect in real time the appearance of an interferer on said one of said communication channels; and carrier means, responsive to said microcontroller means detecting the appearance of an interferer, for selectively switching said carrier frequency to cause said transceiver system to communicate over a communication channel different from said one of said communication channels.

10. The system of claim 9, wherein said receiver means has a radio-frequency (rf) section and said microcontroller means connects to said rf section for monitoring the level of the average rf energy received by said receiver that exceeds a first predetermined threshold.

11. The system of claim 10, wherein said receiver means has an audio section and said microcontroller means connects to said audio section for monitoring the level of said received out-of-band audio energy that exceeds a second predetermined threshold.

12. The system of claim 11, wherein said carrier means includes a multiple-frequency selective oscillator and said microcontroller means includes means for selectively tuning said oscillator.

13. The system of claim 12, wherein said microcontroller means includes a clock means for causing said microcontroller means to monitor the level of said out-of-band energy only after the expiration of a predetermined CHECK-TIME period measured from the previous time that said carrier means switched said carrier frequency.

14. The system of claim 13, wherein said microcontroller means includes a hysteresis means for causing said microcontroller means to detect the appearance of an interferer only after said microcontroller means has found said level of said out-of-band energy to be above said second threshold at least a predetermined number of times over a predetermined time period.

15. The system of claim 14, wherein said first transceiver unit is a base unit and said second transceiver unit is mobile.

16. A method of operating a transceiver unit for communicating over a communication channel selected from a plurality of available communication channels comprising:

transmitting energy having a carrier frequency corresponding to one of said communication channels;

receiving energy having a carrier frequency corresponding to said one of said communication channels;

measuring the average energy received by said transceiver unit over a baseband frequency bandwidth, said average energy including information, interference and noise portions of said average energy;

measuring out-of-band energy received by said transceiver unit, said out-of-band energy primarily comprising interference and noise energy located above the baseband frequency band;

monitoring the level of said average energy above a first threshold and the level of said out-of-band energy above a second threshold in real time to detect the appearance of an interferer on said one of said communication channels; and selectively switching said carrier frequency to cause said transceiver unit to communicate over a communication channel different from said one of said communication channels when said monitoring step detects the appearance of an interferer.

17. The method of claim 16, wherein the step of measuring the average energy includes measuring an average rf energy received by said receiver over a baseband frequency bandwidth and the step of measuring out-of-band energy includes detecting out-of-band audio energy located above an audio baseband.

18. The method of claim 17 further including causing said monitoring of the level of said out-of-band energy to be executed only after the expiration of a predetermined CHECK-TIME period measured from the previous time that said carrier frequency was switched.

19. The method of claim 18 further including causing said monitoring of the level of said out-of-band energy to be executed only after said monitoring step has found the level of said average energy to exceed said first threshold after the expiration of said CHECK-TIME period.

20. The method of claim 19 further including causing said monitoring step to detect the appearance of an interferer only after said level of said out-of-band energy has been found to be above said threshold a predetermined number of times over a predetermined time period.

* * * * *